(12) United States Patent
Sherman et al.

(10) Patent No.: US 9,473,608 B1
(45) Date of Patent: Oct. 18, 2016

(54) INTEGRAL RANGE EXTENDER AND MECHANICAL PROTECTOR SYSTEM FOR A HANDHELD DIGITAL DEVICE

(71) Applicant: Stikbox Ltd., Jerusalem (IL)

(72) Inventors: Yekutiel Sherman, Jerusalem (IL); Yachin Yarchi, Jerusalem (IL); Etay Amir, Petach Tikvah (IL); Omri Bar Zeev, Tel Aviv (IL)

(73) Assignee: STIKBOX LTD., Jerusalem (IL)

( * ) Notice: Subject to any disclaimer, the term of this patent is extended or adjusted under 35 U.S.C. 154(b) by 0 days.

(21) Appl. No.: 14/922,232

(22) Filed: Oct. 26, 2015

Related U.S. Application Data

(63) Continuation-in-part of application No. 14/741,485, filed on Jun. 17, 2015.

(60) Provisional application No. 62/163,415, filed on May 19, 2015.

(51) Int. Cl.
    *H04M 1/00* (2006.01)
    *H04M 1/21* (2006.01)
    *H04M 1/02* (2006.01)

(52) U.S. Cl.
    CPC .............. *H04M 1/21* (2013.01); *H04M 1/026* (2013.01)

(58) Field of Classification Search
    CPC ......... H04M 1/21; H04M 1/026; H04M 1/02
    USPC ................. 455/575.1, 550.1; 396/55–56, 59, 396/419–421, 424–425, 428
    See application file for complete search history.

(56) References Cited

U.S. PATENT DOCUMENTS

| | | | | |
|---|---|---|---|---|
| 7,706,673 B1* | 4/2010 | Staudinger | ............. | F16M 11/06 348/211.2 |
| 8,540,202 B2* | 9/2013 | Hu | ......... | F16M 11/10 108/6 |
| 9,301,584 B2* | 4/2016 | Butts | ...................... | A45C 11/00 |
| 9,360,153 B2* | 6/2016 | Huang | ................... | F16M 11/38 |
| 2004/0223752 A1 | 11/2004 | Ghanouni | | |
| 2007/0053680 A1 | 3/2007 | Fromm | | |
| 2007/0177866 A1 | 8/2007 | Fujioto | | |
| 2015/0029352 A1 | 1/2015 | Burciaga | | |

* cited by examiner

*Primary Examiner* — Nay A Maung
*Assistant Examiner* — Angelica M Perez
(74) *Attorney, Agent, or Firm* — JMB David-Ben David

(57) ABSTRACT

An integral range extender and mechanical protector system for a handheld digital device includes a chassis adapted for securing to the device; and a selectably deployable dual purpose collapsible rod operable in a first, compacted mode for storage across the rear of the device so as to cover a major portion of the area thereof and together with the chassis, to absorb mechanical forces directed towards the sides or rear of the device, and further operable in a second, deployed mode for extension in a direction transverse from the chassis, whereby a first end of the rod is adapted to support the device and a second distal end is adapted to be held in the hand of a user, wherein, in the second mode, use of the collapsible rod permits positioning of the device from the user and use thereof remotely from the user.

9 Claims, 17 Drawing Sheets

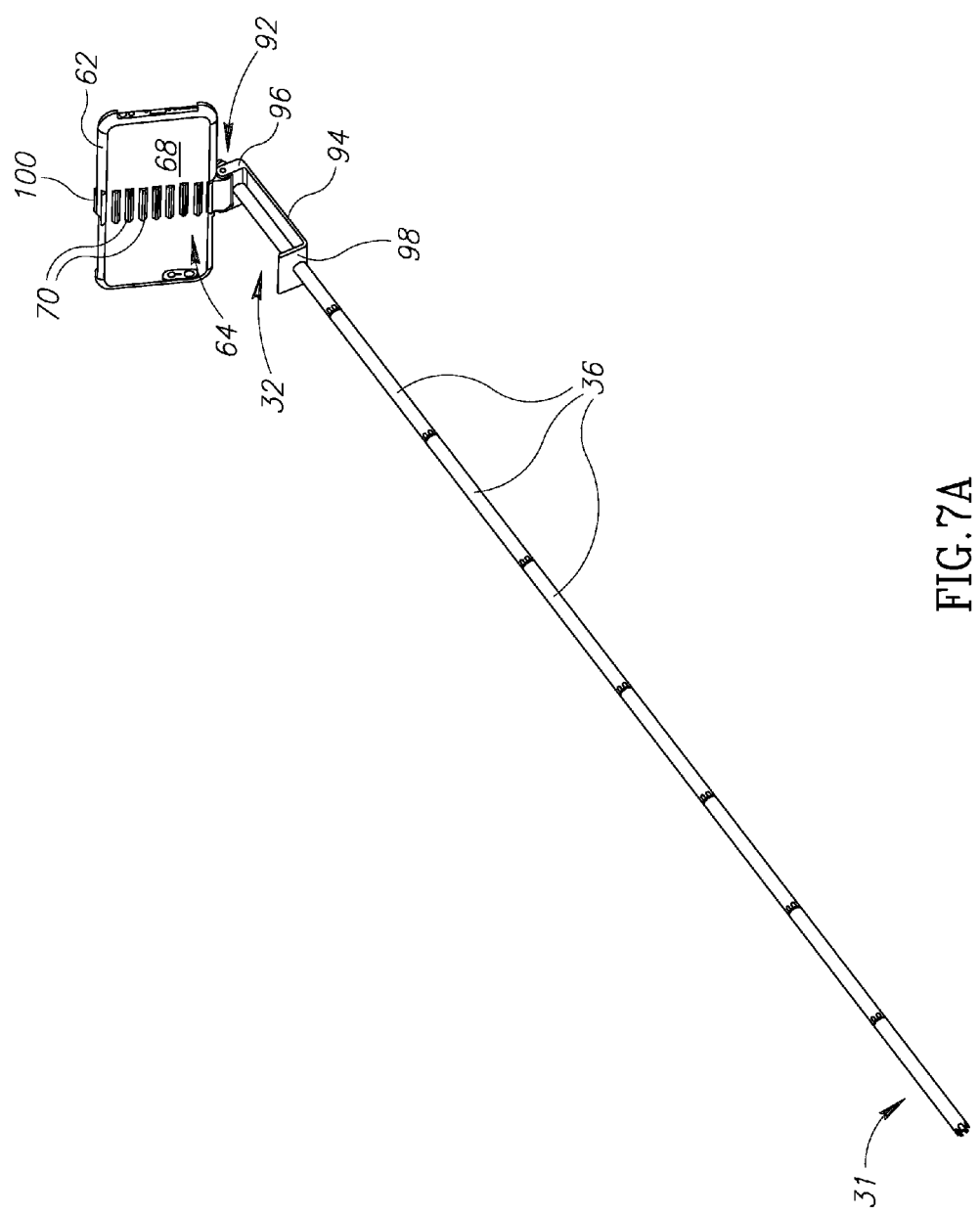

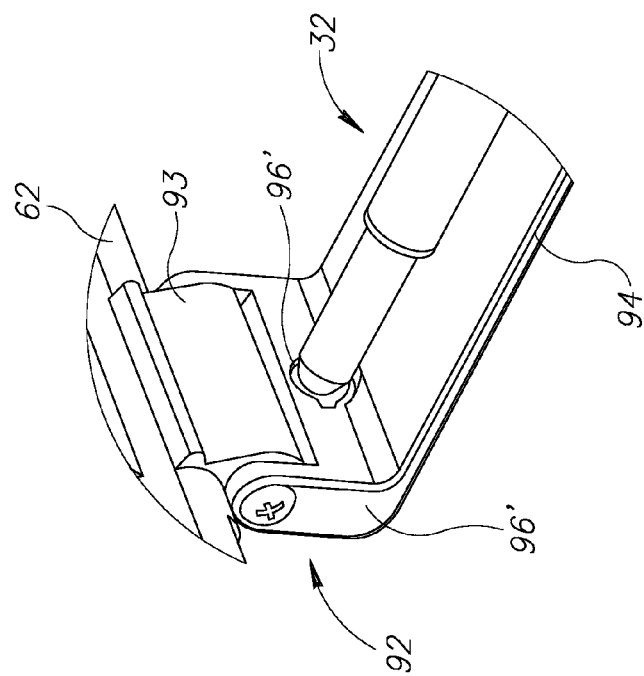
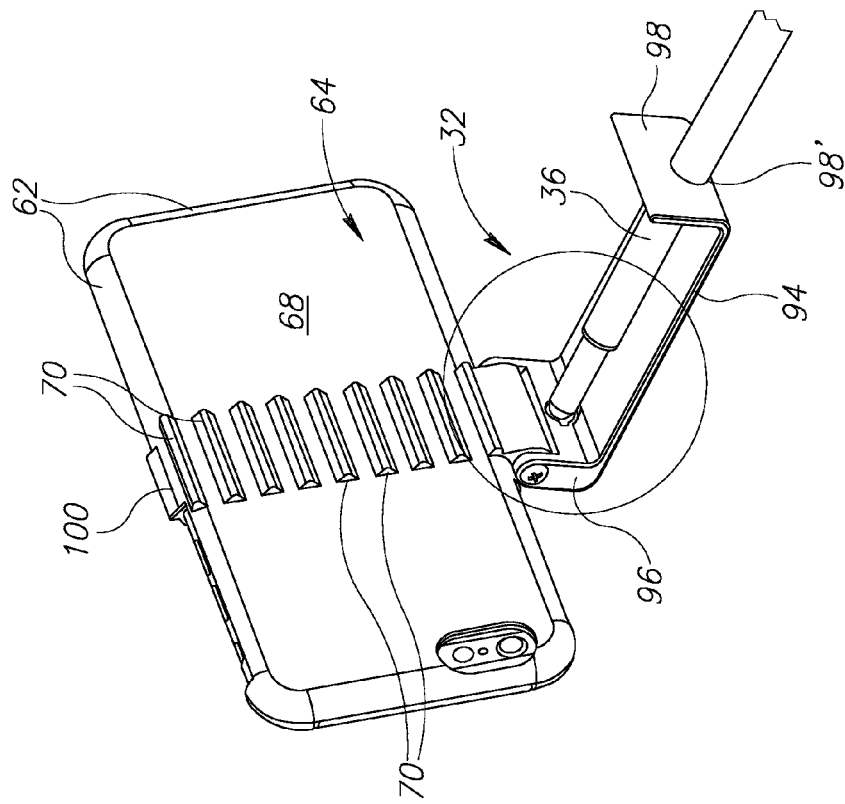
FIG. 7C
FIG. 7B

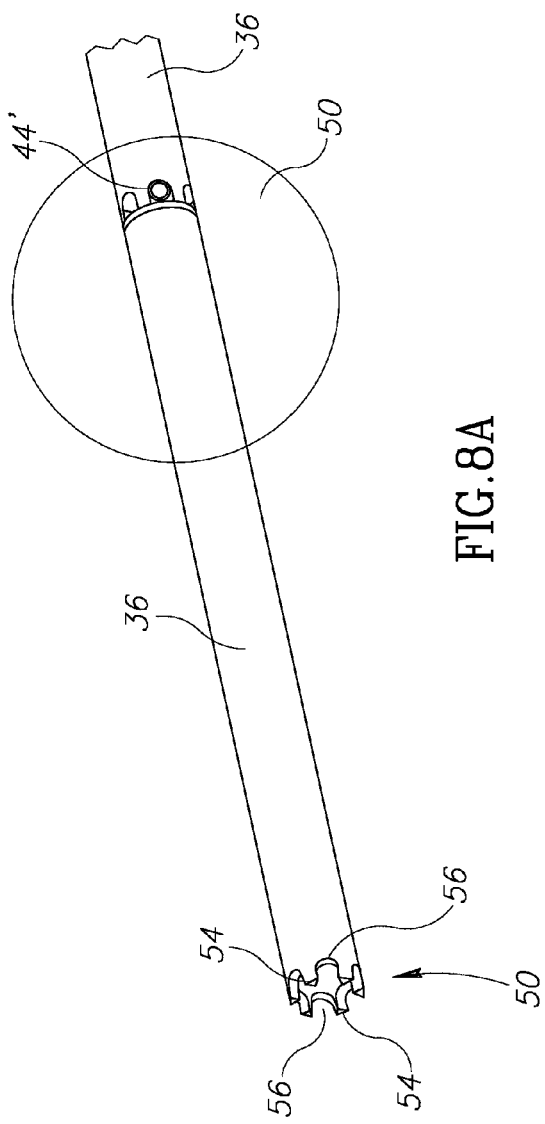
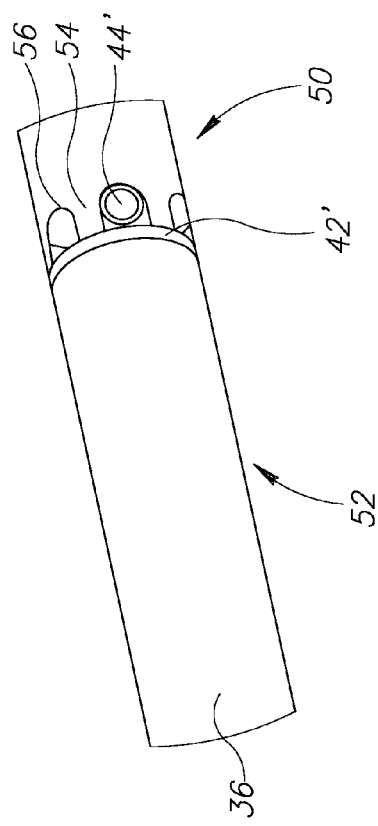
FIG.8A
FIG.8B

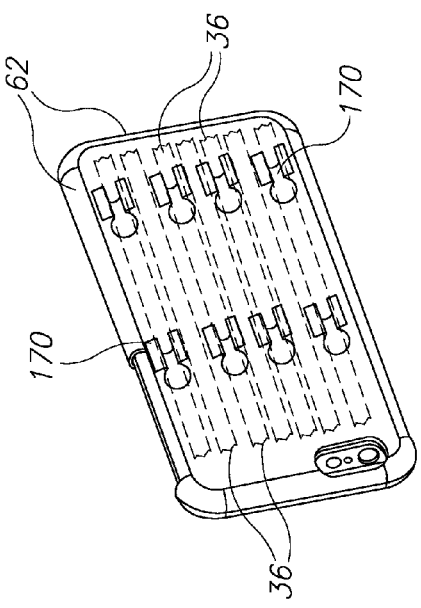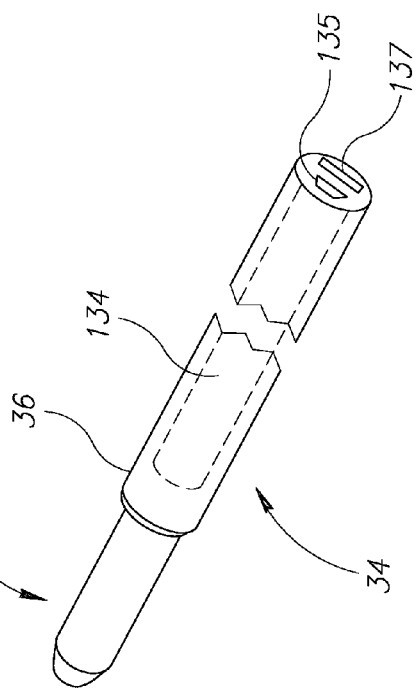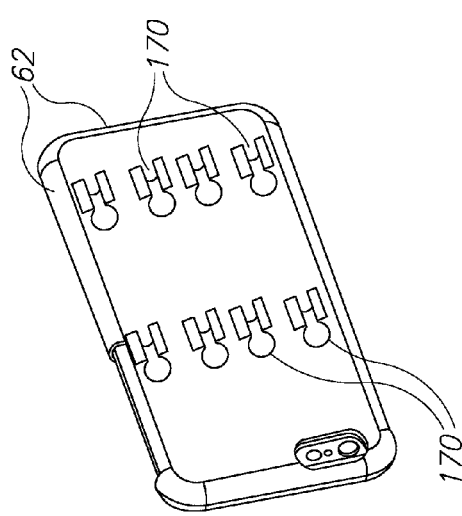

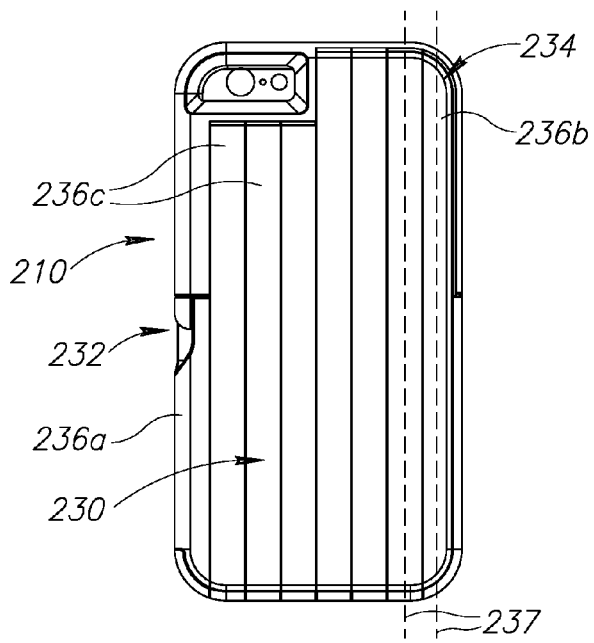
FIG.12A
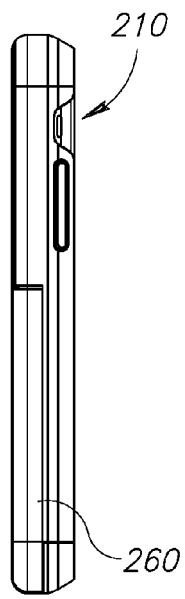
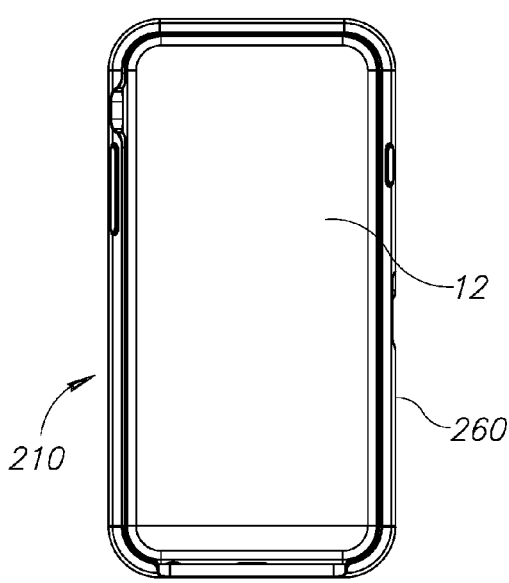
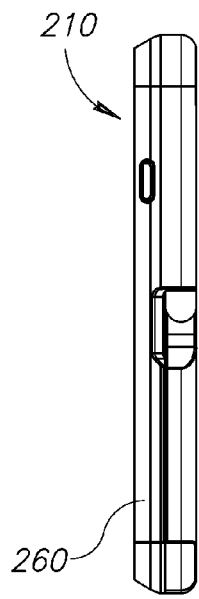
FIG.12C  FIG.12B  FIG.12D
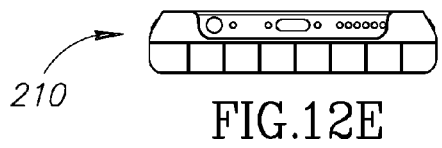
FIG.12E

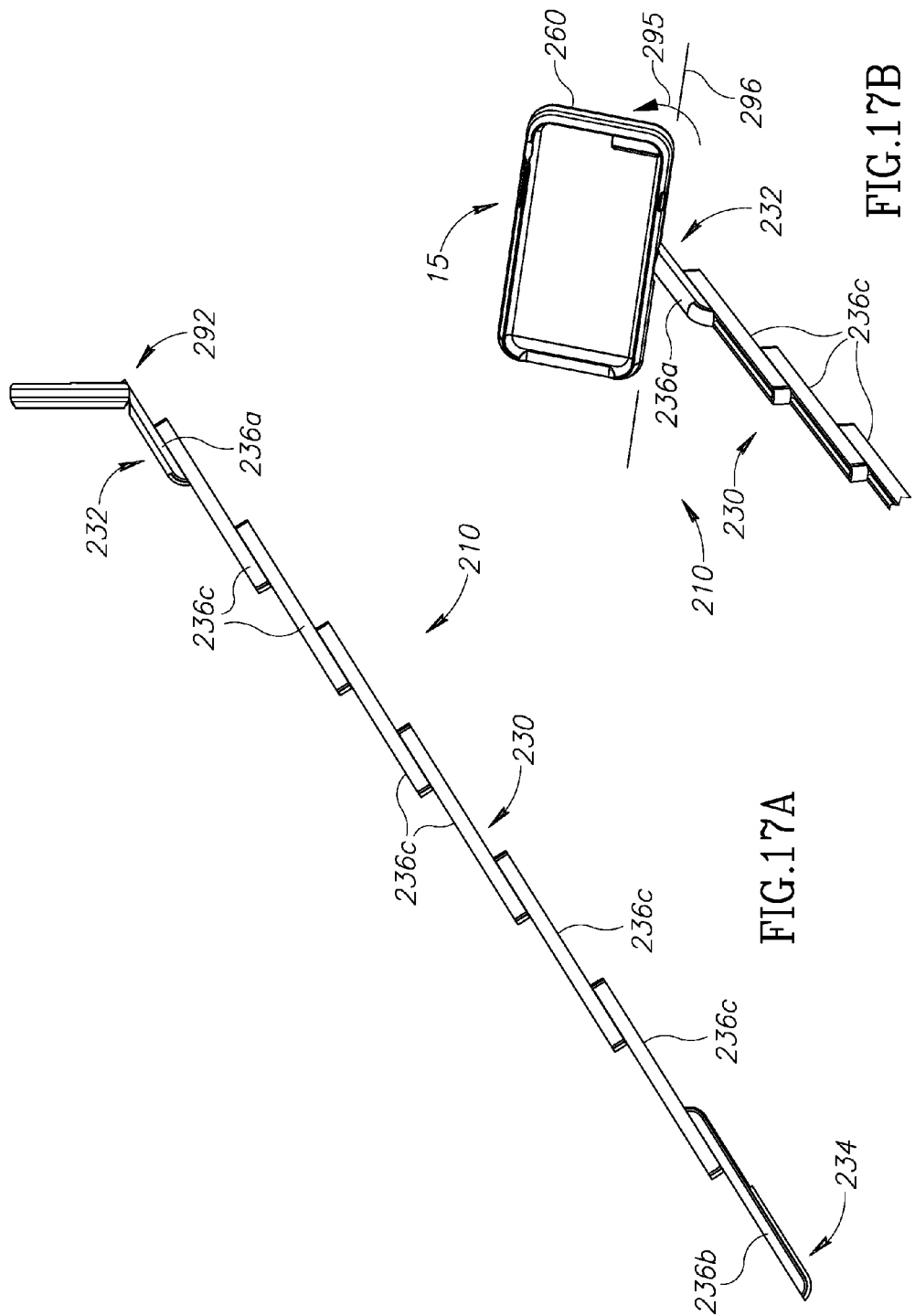

INTEGRAL RANGE EXTENDER AND MECHANICAL PROTECTOR SYSTEM FOR A HANDHELD DIGITAL DEVICE

CROSS REFERENCE TO RELATED APPLICATIONS

This is a Continuation-in-Part of U.S. patent application Ser. No. 14/741,485, filed Jun. 17, 2015, which claims the benefit of U.S. Provisional Patent Application No. 62/163,415, filed on May 19, 2015, both of which are incorporated by reference herein in their entirety.

FIELD OF THE INVENTION

The present invention relates to assistive devices for mobile communications devices generally, particularly mobile phones having photographic capability.

BACKGROUND OF THE INVENTION

Protective cases for mobile phones are well known. They typically include one or two layers of protective plastic/rubber and are fashioned to encase the rear and sides of the phone, thereby to prevent it from being damaged by being dropped or otherwise mechanically impacted. While such cases add bulk and cost to the phone, these factors are outweighed due to their use in preventing damage to an item which is relatively expensive and inconvenient to replace.

More recently, with the advent of high quality digital photography on mobile phones and the widespread internet connectivity of these devices, it has become commonplace for these devices to be used for self-photography, pictures being taken in this manner often then being shared with others or otherwise uploaded to social networking sites on the internet.

A disadvantage of self-photography by use of mobile phones is that the range at which one can hold the phone is limited by the length of the user's arm, such that the resulting picture loses much of the perspective that would normally be present in a convention picture taken by a third party (i.e. someone who is not in the picture).

Furthermore, there are many situations in which the person taking a photograph of scenery or wildlife, for example, would like to take a photograph from somewhat closer to the object being photograph, but is unable to do so as he is limited by the device being held literally at arm's length. This is particularly a problem when taking a photograph with a mobile phone, as conventional phone do not normally have an optical zoom capability, but a digital zoom. When the digital zoom is used, it increases the graininess of the resulting image, such that it is of poorer quality than desired.

In an effort to solve this problem, so-called 'selfie sticks' have been developed. Essentially, they enable a user to hold a stick which, in turn, supports the mobile phone distally from the end being held by the user. This therefore extends the range of useful use by a distance equal to the length of the stick. Early range extender sticks, intended for use with photographic equipment which does not necessarily include mobile phones are described, at least in part, in US Patent Publications Nos. 2004/0223752 and 2007/0177866.

However, one of the well-known problems of selfie sticks is that they are bulky to carry around and thus inconvenient.

US Patent Publication No. 2007/0053680 discloses a telescopically extendible grip for a camera which represents an approach which could be useful in mitigating the bulkiness of selfie sticks, although the described 'grip for a camera' still represents an article which must be carried in addition to the camera in order to be used. Having such an additional item is an additional item to remember, or potentially forget and lose.

US Patent Publication No. US 2015/0029352 entitled Collapsible Cell Phone Boom Arm is directed to an extendible boom arm which is attached to a cell phone casing. In concept, this is similar to the ExtendaPic iPhone 5/5s Case, shown at http://www.extendapic.com/.

While both represent an improvement over previous solutions, as they are based on the use of a telescopic arm, the additional range that they can provide is, by definition, limited.

SUMMARY OF THE INVENTION

There is provided an integral range extender and mechanical protector system for a handheld digital device, which includes a chassis adapted for securing to the device; and a selectably deployable dual purpose collapsible rod operable in a first, compacted mode for storage across the rear of the device so as to cover a major portion of the area thereof and together with the chassis, to absorb mechanical forces directed towards the sides or rear of the device, and further operable in a second, deployed mode for extension in a direction transverse from the chassis, whereby a first end of the rod is adapted to support the device and a second distal end is adapted to be held in the hand of a user, wherein, in the second mode, use of the collapsible rod permits positioning of the device from the user and use thereof remotely from the user.

Additionally, the collapsible rod includes a plurality of parallel, interconnected rod elements configured for side by side substantially overlapping, coplanar arrangement when in the first compacted mode.

Further, the interconnected rod elements are further configured for side by side partially overlapping, coplanar arrangement when in the second deployed mode.

Additionally, each of the plurality of interconnected rod elements is a linear element having a longitudinal axis, adapted for an axial sliding motion parallel to at least one other adjacent rod element, the axial sliding motion in a first direction being required so as to achieve extension of the collapsible rod from the compacted position, and further, in a second direction opposite to the first direction, so as to achieve retraction of the collapsible rod from the deployed position to the compacted position.

Further, the plurality of interconnected rod elements include a first end element terminating in the first end for engaging the device; a second end element terminating in the second end for being held in the hand of a user; and a plurality of interconnected intermediate elements connected to the first and the second end elements.

Additionally, each of the rod elements is adjacent to and operative for interlocking engagement with and side by side sliding along at least one other of the plurality of rod elements.

Further, each intermediate element is adjacent to and operative for interlocking engagement with and side by side sliding along two of the plurality of rod elements.

Additionally, each rod element includes a track configured to face laterally towards an adjacent rod element in a first direction, a link element formed on the opposite side of the rod element relative to the track so as to extend towards an adjacent rod element in a second direction, opposite to the first direction, wherein the link element of one rod element is adapted to engage the track of an adjacent element so as to be slidably movable therealong; and a stop element provided at the end of the track so as to prevent disconnection of the link element from the track of the adjacent element.

Further, the first end element is connected to the chassis via a hinge arrangement having multiple, preferably two or more degrees of freedom so as to facilitate the angular adjustment of said chassis and device relative to said collapsible rod.

Additionally, the system includes remotely located control for operating the digital device.

Further, the remotely located control is mounted at the second, distal end of the collapsible rod.

BRIEF DESCRIPTION OF THE DRAWINGS

The present invention will be more fully understood and appreciated from the following detailed description taken in conjunction with the drawings in which:

FIG. 7A shows the complete system shown in FIGS. 1-5, in a second fully deployed position, when supporting a digital device therein;

FIG. 7B shows the mounting of the device-carrying chassis and dual purpose engagement member of the system with the dual purpose collapsible rod thereof, when in a fully extended position;

FIG. 7C shows an enlarged view of a portion of FIG. 7B;

FIG. 8A shows a single rod element connected to an adjoining rod element; and FIG. 8B is an enlarged view of the connection in FIG. 8A, illustrating a preferred anti-rotation locking mechanism provided thereat;

FIGS. 10A and 10B shows the rear side of the chassis as seen in FIGS. 7A and &7B, but having clips provided thereon for fastening the collapsible rod thereto;

FIG. 11 is a schematic illustration of a handle portion of the collapsible rod, housing therein a backup battery;

FIGS. 12A-12E are rear, front, left side, right side and bottom views of an integral range extender and mechanical protector system for a digital device, mounted onto a digital device, constructed in accordance with an additional embodiment of the present description, in a compacted mode;

FIG. 17A is a further side view of the system when fully deployed; and

FIG. 17B is a front view of the system when fully deployed.

DETAILED DESCRIPTION

Figure 1:
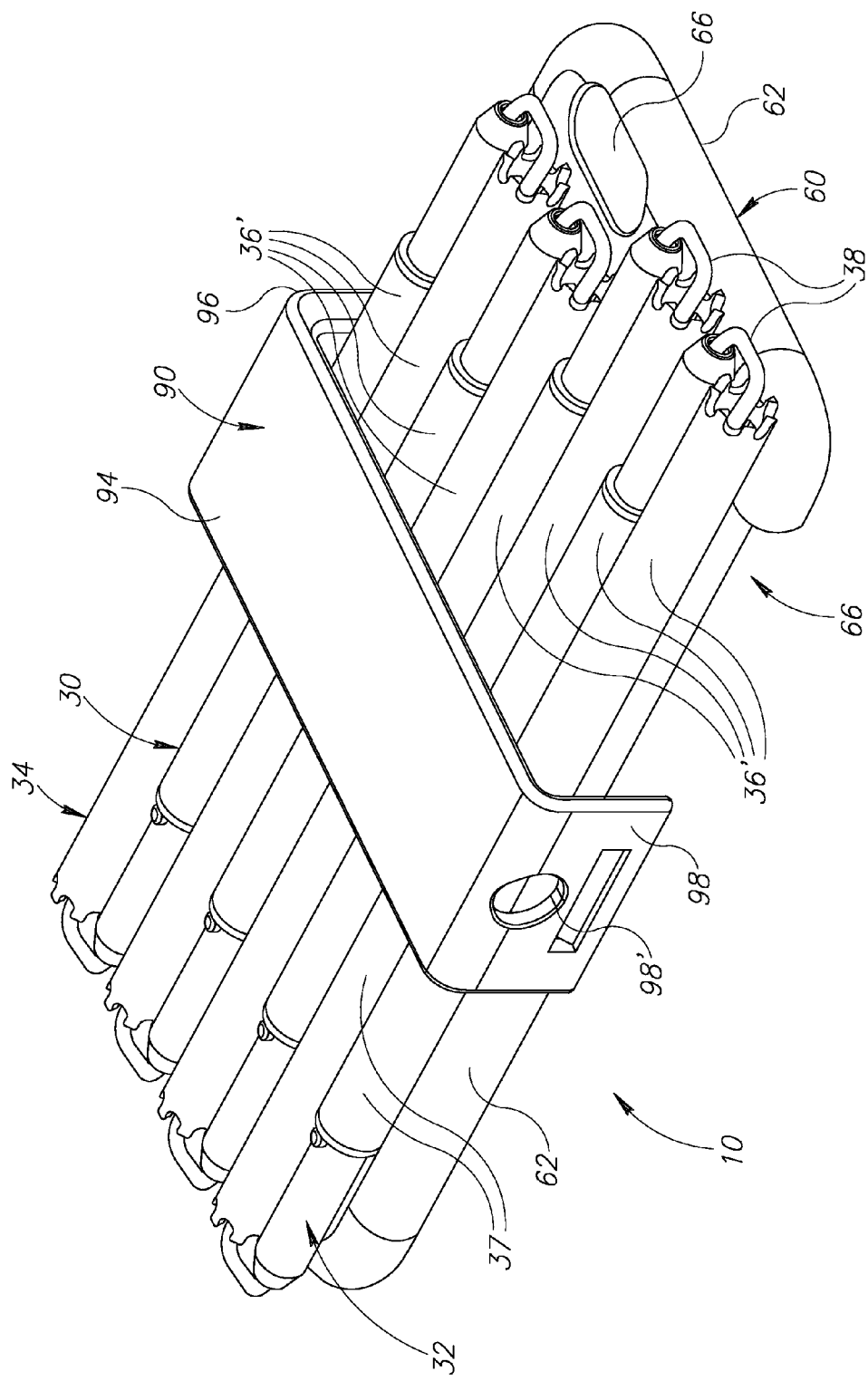
FIG. 1 is a rear isometric view of an integral range extender and mechanical protector system for a digital device, constructed in accordance with the present description, in a closed position.

Referring initially to FIG. 1-5, there is described an integral range extender and mechanical protector system 10 for a handheld digital device 12 (FIGS. 4A-5) such as a digital camera and/or video device or an audio recording device. Typically, the digital device combines both of these capabilities as well as transmission capabilities, such as found in a mobile phone, although the use of the present system is not limited thereto.

The system 10 includes a selectably deployable dual purpose collapsible rod, referenced generally 30, and a chassis, referenced generally 60. Preferably, there is also provided a dual purpose engagement member, referenced generally 90, which is operative both to assist in securing rod 30 in position when stored, and also to support device 12 and chassis 60 on rod 30 when extended.

When rod 30 is being used to extend support device 12 remotely from a user (FIGS. 6A-7C), as with so-called "selfie sticks", the rod 30 connects at a first end 32 to the dual purpose engagement member 90, and is held, typically in the hand of a user, at the second, free end 34 (FIGS. 1, 2, 6A and 7A).

Figure 9A:
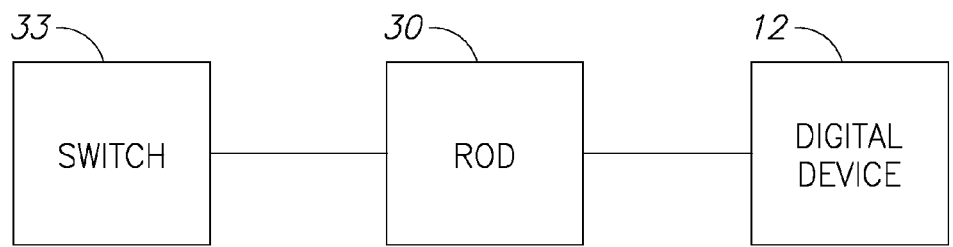
FIGS. 9A and 9B is a block diagram illustration of basic interactive operational components of the integral range extender and mechanical protector system and a mobile communications device, wherein the digital device is operated via a wired connection and a wireless connection, respectively.
Figure 9B:
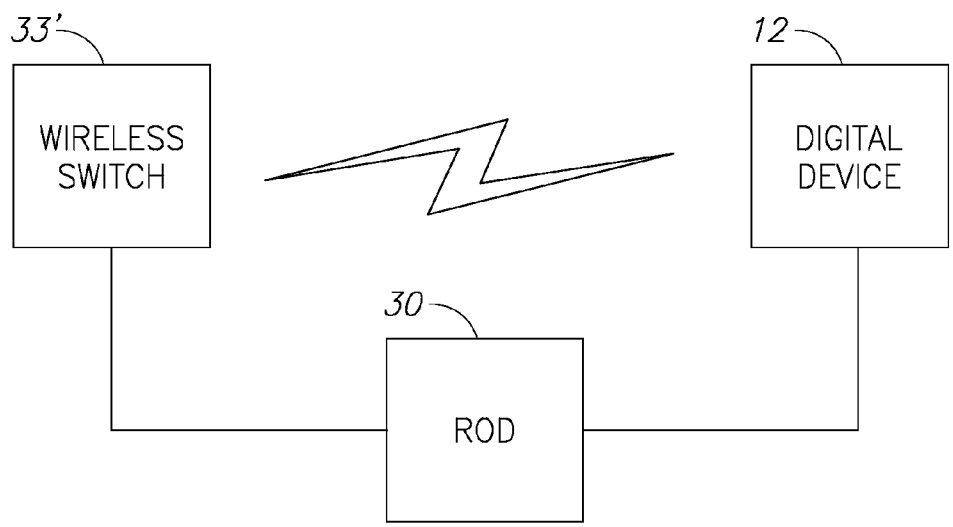

Referring now briefly to FIGS. 9A and 9B, it is seen that when device 12 is supported on second end 34 of the rod 30, remotely from the user, a suitable selector or switch 33 (FIG. 9A), connected to device 12 via a suitable wired connection, or a wireless switch 33' (FIG. 9B), such as a Bluetooth button or the like, is used to activate device 12. If switch 33 is a wired switch as depicted in FIG. 9A, then it is located on the second end 34 of the rod 30, substantially as known in the art. However, if switch 33' is a wireless switch as depicted in FIG. 9B, it may be mounted on second end 34 of the rod 30 held by the user or hand-carried separately.

In yet a further embodiment, the Bluetooth switch may be implemented as a Bluetooth function of a mobile device being carried by a pre-authorized additional person in the vicinity of the user.

When not in use, the rod 30 is disconnected from the engagement member 90. It is then collapsed or folded, as described below, and placed in a storage position on the back of the chassis 60 after which it is secured by the dual purpose engagement member 90. As described below, rod 30 is manufactured so as to be strong, while nonetheless taking up minimal space, having a small diameter. Accordingly, as it is stored so as to cover most of the rear panel 64 of chassis 60, it cooperates therewith to provide substantive mechanical protection to device 12.

The rod 30 is formed so as to be small and lightweight so as have minimal bulk, strong so as to enable minimal size and maximum length, and easily deployable. To this end, it is formed preferably of a series of thin diameter elements 36, each preferably no more than 8 mm in diameter. Preferably, they are produced by a 3-D printing process and formed of PLA and/or ABS mixed with a multi-directional carbon fiber. In accordance with a preferred embodiment, when system 10 is manufactured for use in conjunction with a mobile phone such as a Samsung Galaxy 56® or an iPhone 6®, the length of the rod 30 when fully assembled may be 80 cm or more.

A strong elastic cord 38 runs through the interior of the rod elements 36 so as permit compact, folded storage. However, once the engagement member 90 is opened and the rod 30 is released, the presence of the elastic cord imposes a tensile force along the length of the rod 30 so that all of its elements 36, free of any constricting forces, are brought into alignment and axially pulled together by the cord 38 into end-to-end mating connection with each other, such that the rod 30 becomes fully deployed and ready for use, as above.

Figure 4A:
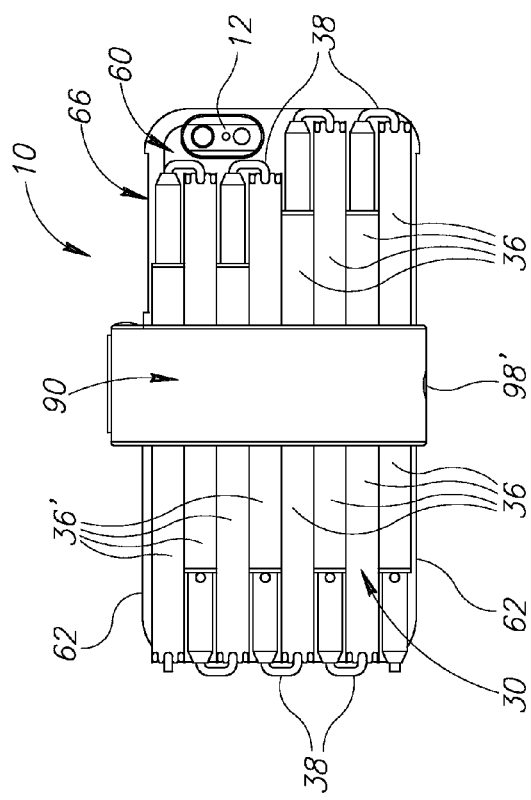
FIGS. 4A-4D show the system as seen in FIG. 1 when mounted onto a digital device, depicted from the rear, top, side and bottom, respectively.
Figure 4D:
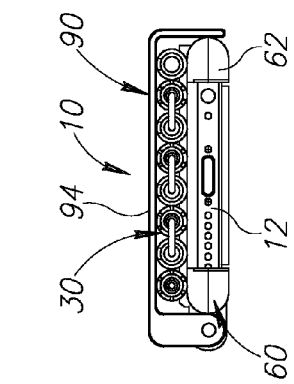
Figure 4C:
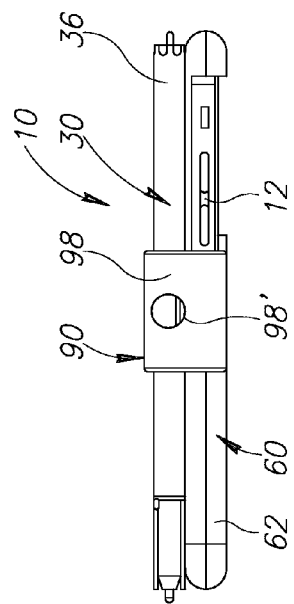
Figure 4B:
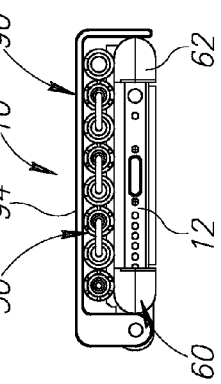
Figure 5:
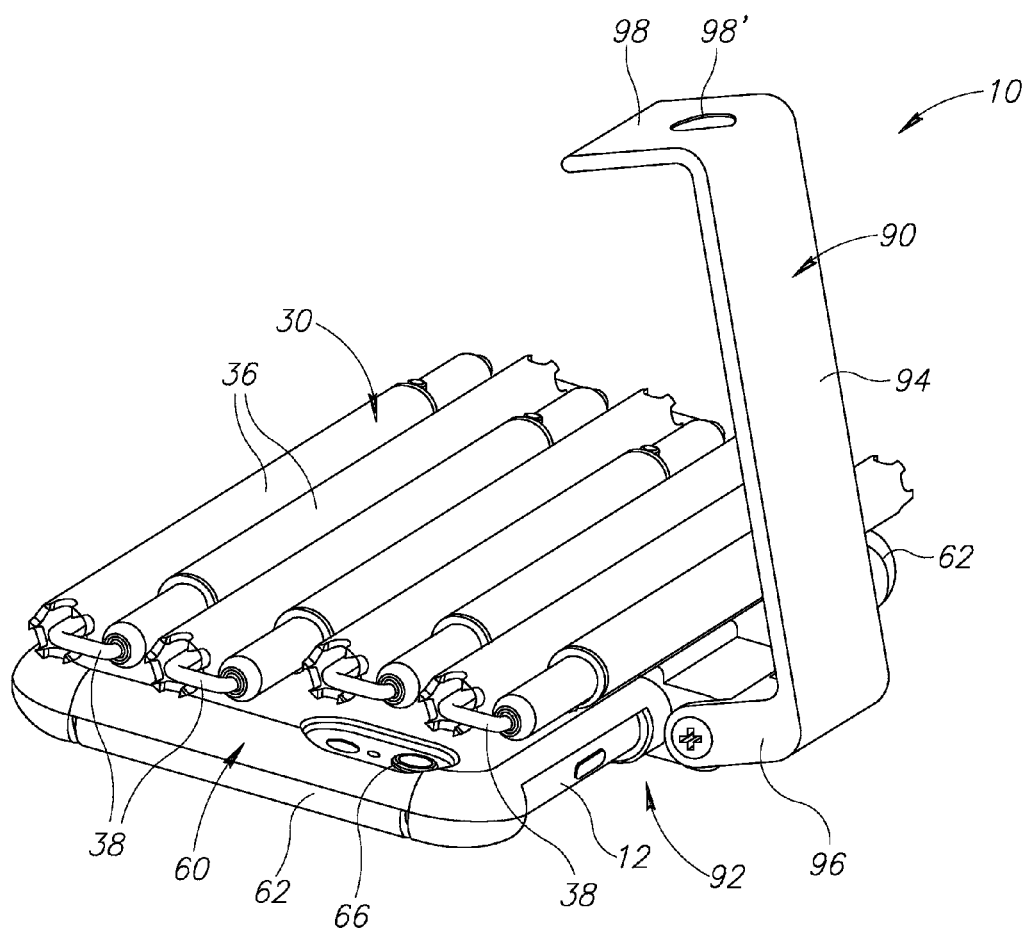
FIG. 5 shows the system as seen in FIG. 2 when mounted onto a digital device.

Mobile phones have various features that must be accessible even when stored in a holder. These may include operating switches, view finders, earphone jacks, power ports and the like. Accordingly, if required, suitable openings 66 are formed in the chassis 60, both on the perimeter edges 62 and on the rear panel 64 so as to enable convenient access to these features when the system 10 is assembled on device 12. Furthermore, as illustrated in the drawings, the rod elements 36 are formed of specific sizes so that when the rod 30 is in storage on the back of the chassis 60, they do not obscure the above features, and allow convenient access thereto. Thus, as seen in FIGS. 1 and 4A, in the present example, rod elements 36' are shorter than the remaining elements 36.

The chassis 60 is formed such that's its perimeter edges 62 grip and protect the device 12 along its four edges, and such that the rear panel 64 overlies the rear of the device 12 in a manner which is generally similar to known mobile phone holders. Accordingly, other than showing these features clearly in the drawings, they are not specifically described again herein, being well known to one skilled in the art.

However, as seen particularly in FIGS. 7A and 7B, the outward-facing side 68 of rear panel 64 is especially configured so as to engage rod elements 36 when rod 30 is folded down for storage. According to one embodiment, there are provided positioning elements 70, illustrated herein as ridges, operative to receive the rod elements 36 therebetween when the rod 30 is folded, so as to prevent lateral movement relative to the rear panel 64, when stored.

Referring briefly to FIGS. 10A and 10B, there may be provided fastening elements 170 as clips or the like so as to grasp the rod elements 36 therebetween so as to fasten them to the rear side of chassis 60, and not merely position them as in the present embodiment. It will be appreciated that the schematically illustrated clips 170 represent merely one possible way of fastening the rod elements 36 to the rear of the chassis 60, and is intended to include any equivalent manner of doing the same.

Dual purpose engagement member 90 is connected to chassis 60 by a suitable hinge construction 92. In the illustrated embodiment it has a generally elongated U-shaped clasp configuration, having a central portion 94 which is approximately equal to the width of the chassis 60, and first and second end portions, respectively referenced 96 and 98. The engagement member 90 is formed so as to snugly contain the folded rod 30 in storage, against the rear side of the chassis 60.

Each of the shorter end portions 96 and 98 has a specific task. First end portion 96 is not only connected by hinge 92 to a suitable flange portion 93 formed on the side of the chassis 60, but it also has formed therein a first shaped opening 96'. Second end portion 98 is a free end, operative in securing rod 30 against the rear panel 64 of chassis 60, as engagement member 90 is closed about hinge 92 and second end portion 98 is locked against a fastener element 100 formed integrally with chassis 60. As the engagement member 90 and chassis 60 are formed from high strength materials with a certain amount of elasticity, engagement member 90 is opened merely by grasping the free edge of second end portion 98 and flexing out outward and over the fastening element 100. Alternatively, any other suitable method of locking engagement member 90 about rod 30 may be employed.

Figure 6A:
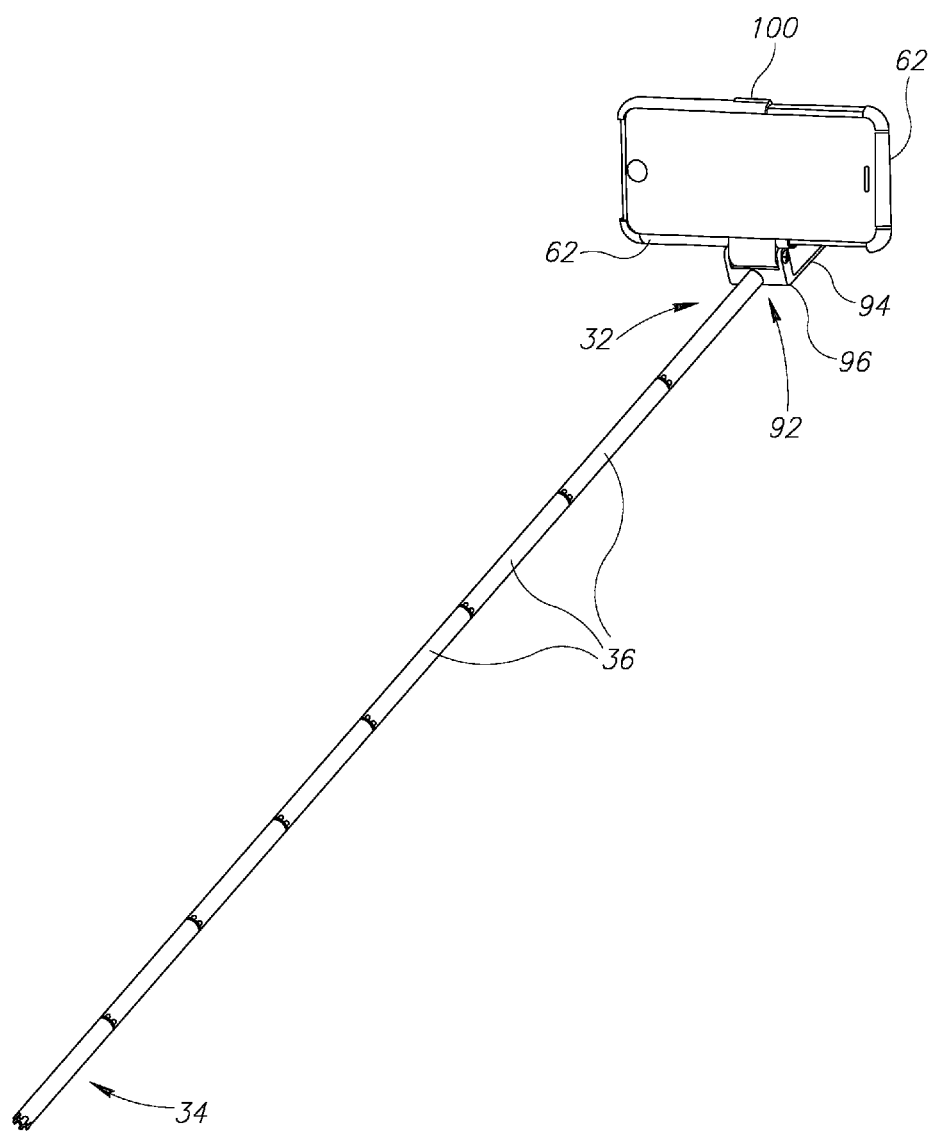
FIG. 6A shows the complete system shown in FIGS. 1-5, in a first fully deployed position, when supporting a digital device therein.
Figure 6C:
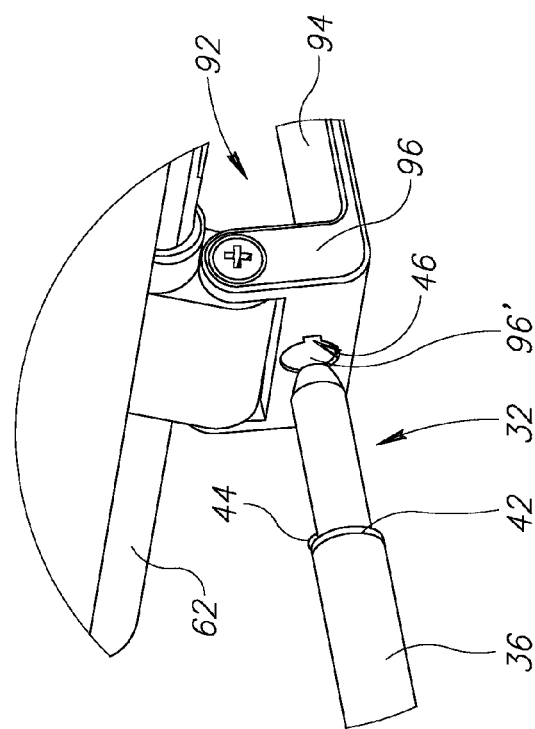
FIG. 6C shows an enlarged view of a portion of FIG. 6B.
Figure 6B:
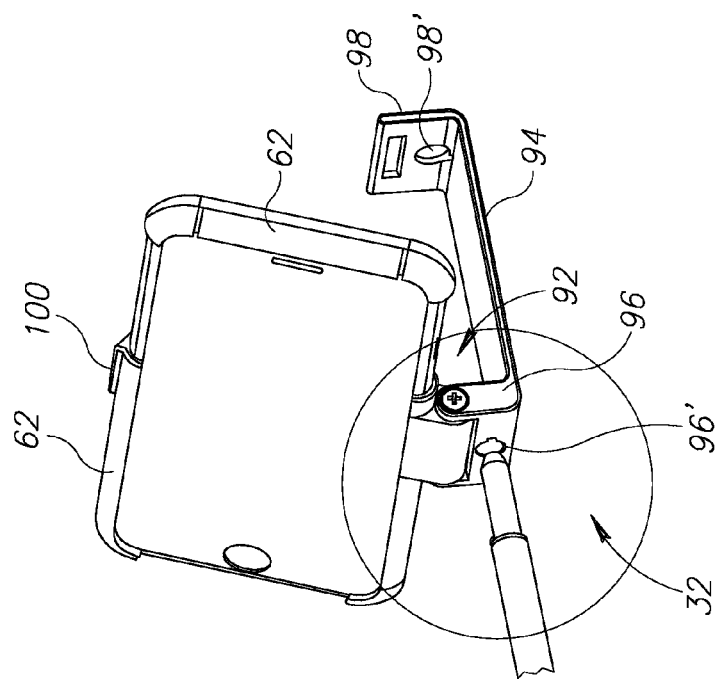
FIG. 6B shows the mounting of the device-carrying chassis and dual purpose engagement member of the system with the dual purpose collapsible rod thereof, when in a fully extended position.

First shaped opening 96' is formed so as to engage with a free end portion of the rod 30, and, as illustrated in FIGS. 6A-6C, so as to support the device 12. The free end portion of the rod 30 terminates in a male locking member 40 adapted for insertion through first shaped opening 96' as seen in FIG. 6C. The radius of male locking member 40 is smaller than that of the remainder of rod element 36, thereby forming a limiting shoulder, seen at 42. As seen, the respective diameters of both the first shaped opening 96' and male locking member 40 are approximately equal, thereby to permit locking member 40 to pass smoothly through the opening 96' until limiting shoulder 42 abuts the edge opening 96'.

It is however necessary to prevent rotation of the device 12 about the rod 30, thereby to ensure complete control of the position of device 12 when being held via rod 30. Accordingly, locking member 40 typically has formed thereon a radially oriented locking protrusion 44 immediately adjacent the limiting shoulder 42, adapted for insertion into locking engagement with a corresponding notch 46 formed adjacent to and communicating with shaped opening 96'. It will be appreciated that when protrusion 44 is engaged with notch 46, engagement member 90 and therefore chassis 60 and device 12 are prevented from rotating about rod 30.

In accordance with a preferred embodiment, first end portion 96 of the engagement member 90 supports the device merely by engagement of rod 30 in first shaped opening 96'.

In an alternative embodiment, there may be provided a second shaped opening 98' in second end portion 98 of engagement member 90, wherein second shaped opening 98' is coaxially aligned with opening 96', but has a diameter which is approximately equal to that of rod element 36. When device 12 is mounted onto rod 30 in this manner, as illustrated in FIGS. 7A-7C, rod element 36 passes completely through second opening 98' so as to extend across the gap between the second and first end portions of engagement member 90 and parallel to central portion 94. As seen, in this embodiment, male locking member 40 is also inserted through and locked with first shaped opening 96' in a manner similar to that shown and described above in conjunction with FIGS. 6A-6C, but from the interior of the clasp shaped engagement member 90. In this manner, rod 30 is operative to support chassis 60 and thus device 12 at two points, thus providing even greater stability, and thus also enabling the first engagement portion 96 to be made somewhat less thick.

As discussed above, it is desirable that when a user is holding a device 12 by use of rod 30, no rotation should occur between device 12 and the rod. Accordingly, this then requires that once the rod elements 36 are assembled, they too are locked in a position whereat no relative rotation with respect to their longitudinal axis is permitted.

Figure 2:
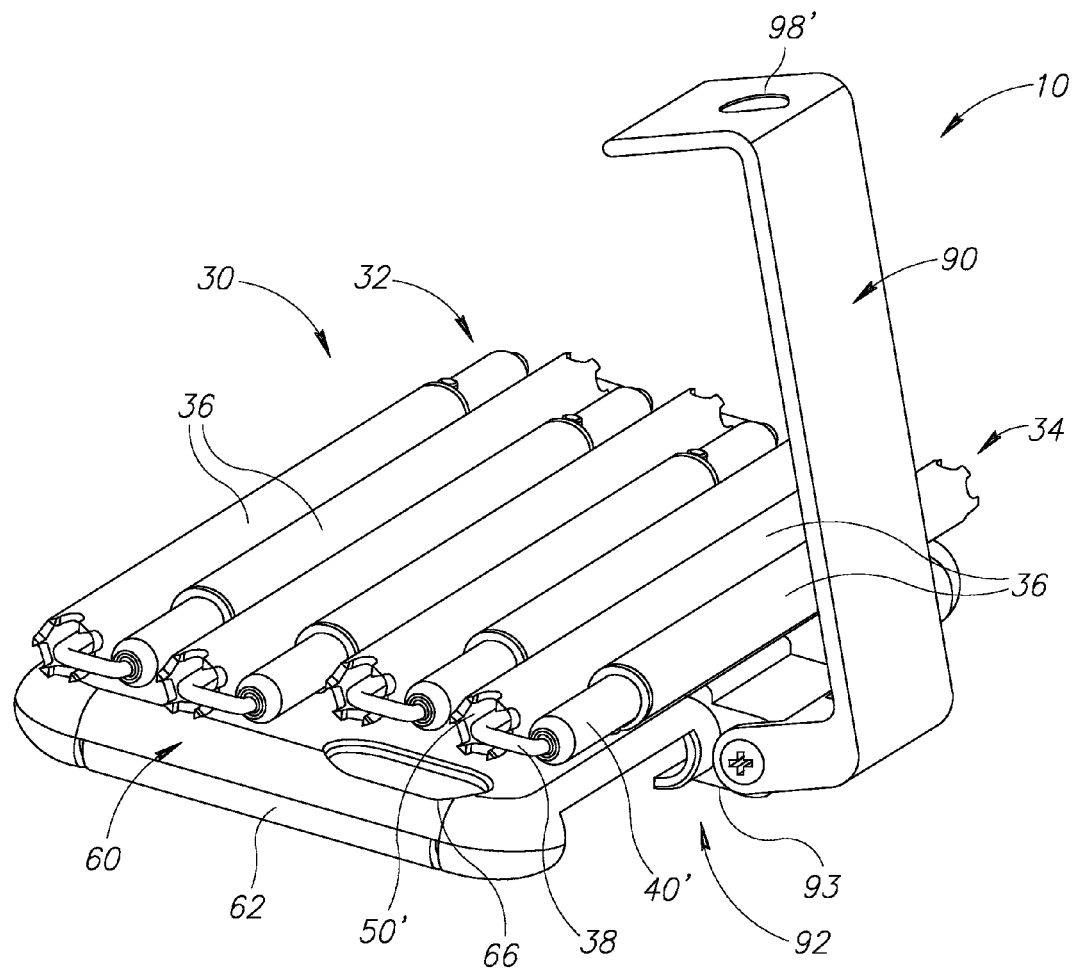
FIG. 2 is a rear isometric view of the system of FIG. 1 but in a partially open position.
Figure 3:
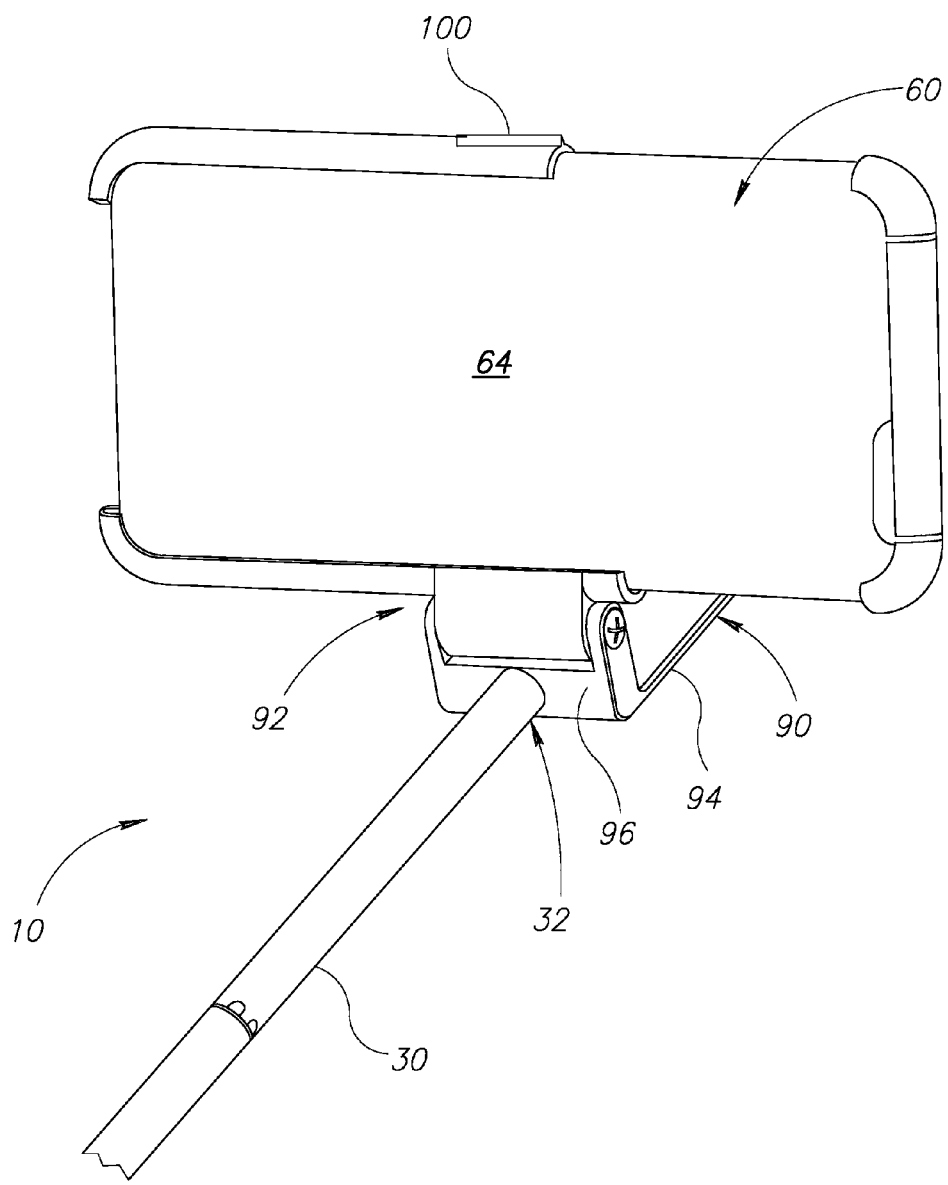
FIG. 3 is a front isometric view of the system of FIGS. 1 and 2, in a fully deployed position.

Referring now to FIGS. 2, 8A and 8B, in order to prevent such undesired rotation from occurring, rod elements 36 are formed so as to interlock once they are engaged with each other. Each rod element 36, in the present embodiment, is provided with different first and second ends, respectively referenced 50 and 52.

First end 50 has formed thereat a series of crenations, or an alternating sequence of teeth 54 and notches 56. The second end 52 of each rod element 36 is provided with a male locking member 40' (FIG. 2) which is similar to male locking member 40, shown and described above in conjunction with FIG. 6C. Accordingly, locking member 40' is smaller than that of the remainder of rod element 36, thereby forming a limiting shoulder, seen at 42'. The respective diameters of both the end opening 50' (best seen in FIG. 2) of first end 50 and male locking member 40' (FIG. 2) are approximately equal, thereby to permit locking member 40' to pass smoothly through the opening 50' until limiting shoulder 42' abuts teeth 54.

In order to prevent relative rotation between the two mutually engaged rod elements 36, however, locking member 40' typically also has formed thereon a radially oriented locking protrusion 44' immediately adjacent the limiting shoulder 42', adapted for insertion into locking engagement with any of the notches 56. As described above, when the rod 30 is released for deployment, adjacent rod elements 36 are straightened under the force of the elastic cord 38, and the adjacent first and second ends 50 and 52 of each pair of adjoining rod elements 36 are pulled together under the force of the cord 38. Therefore, all that is required so as to obtain full, non-rotational engagement of two adjoining rod elements 36, is that locking protrusion 44' of male locking member 40' engages any one of the notches 56 of the facing first end 50.

As described hereinabove, rod elements 36 are hollow, thereby being lightweight, and being suitable for a male-female interlocking mating when rod 30 is assembled and fully deployed. However, in accordance with one embodiment, and referring now to FIG. 11, the rod element 36 which functions as a handle when rod 30 is deployed, may serve to house a rechargeable backup battery 134, suitably configured so as to fit within the hollow interior of the rod element 36. Operating generally as known for such backup batteries, the exposed end of battery 134 typically has a micro-USB port 135 so as to facilitate charging thereof, and a USB port 137 for charging an electrical device such as digital device 12.

Referring now to FIGS. 12A-12E, there is provided an integral range extender and mechanical protector system 210 for a handheld digital device 12, constructed in accordance with an additional embodiment of the present description, in a compacted mode. System 210 is detailed herein, substantially only with regard to differences relative to system 10, shown and described hereinabove in conjunction with FIGS. 1-11.

System 210 includes a chassis 260 adapted for securing to the device 12 and a selectably deployable dual purpose collapsible rod 230. Rod 230 is operable in a first, compacted mode for storage on the rear 261 (FIGS. 13A-16) of chassis 260, and together therewith so as to cover a major portion of the rear of the device 12. Together with the chassis 260, rod 230 is operative to absorb mechanical forces directed towards the sides or rear of the device 12.

Figures 13A, 13B:
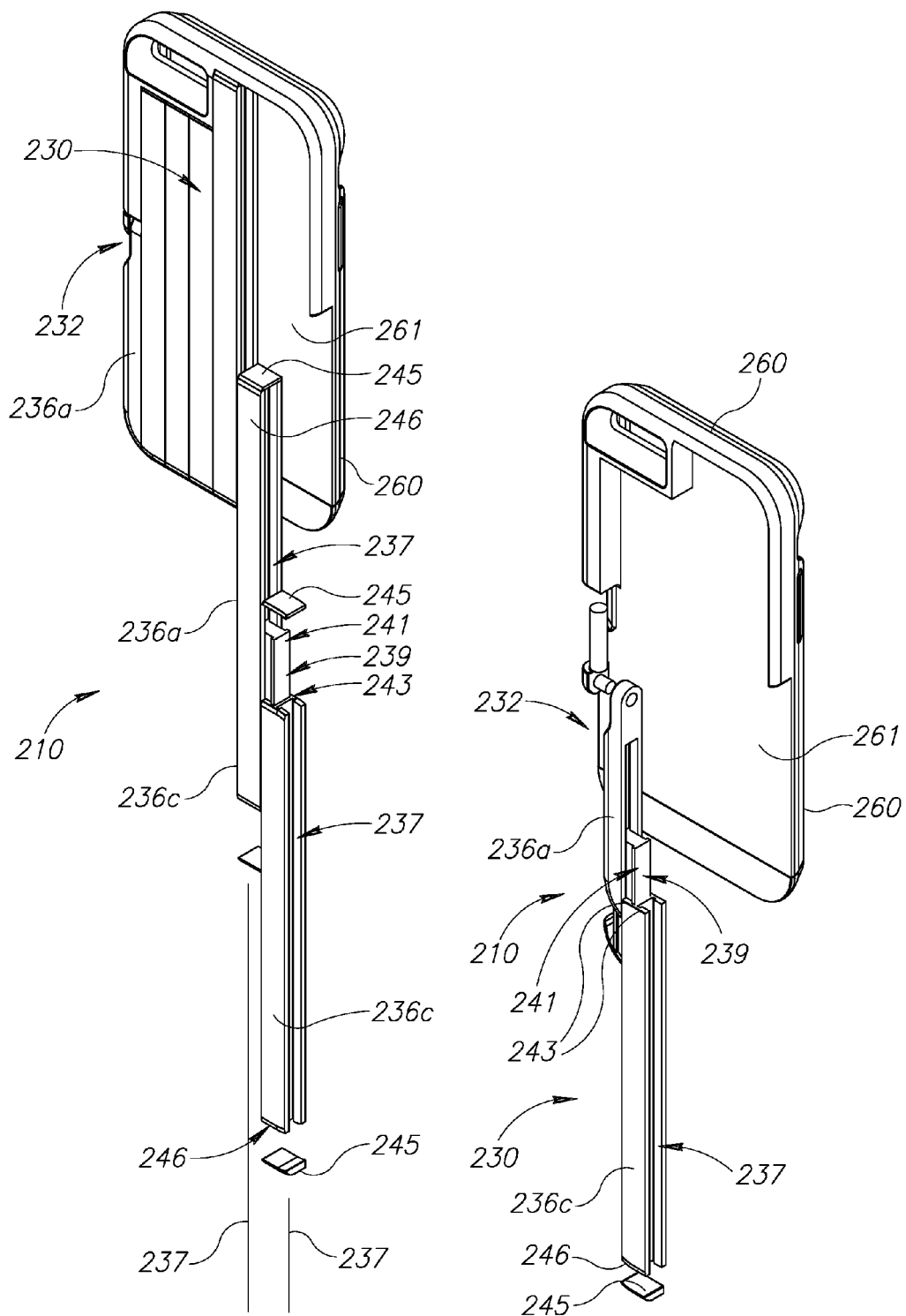
FIG. 13A is a partially exploded isometric rear view of the system seen in FIGS. 12A-12E, in an intermediate position of extension.
FIG. 13B is a yet further exploded view of that seen in FIG. 13A, wherein only a first end portion of the rod is depicted, detailing in exploded view a hinge arrangement by which the rod connects to the chassis of the system.
Figure 15:
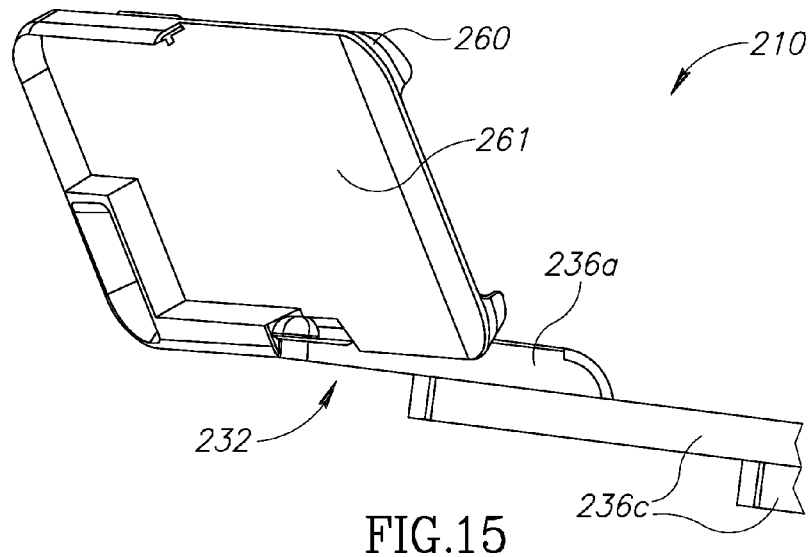
FIG. 15 is a rear perspective view of the system, similar to FIG. 14B.
Figures 14A, 14B:
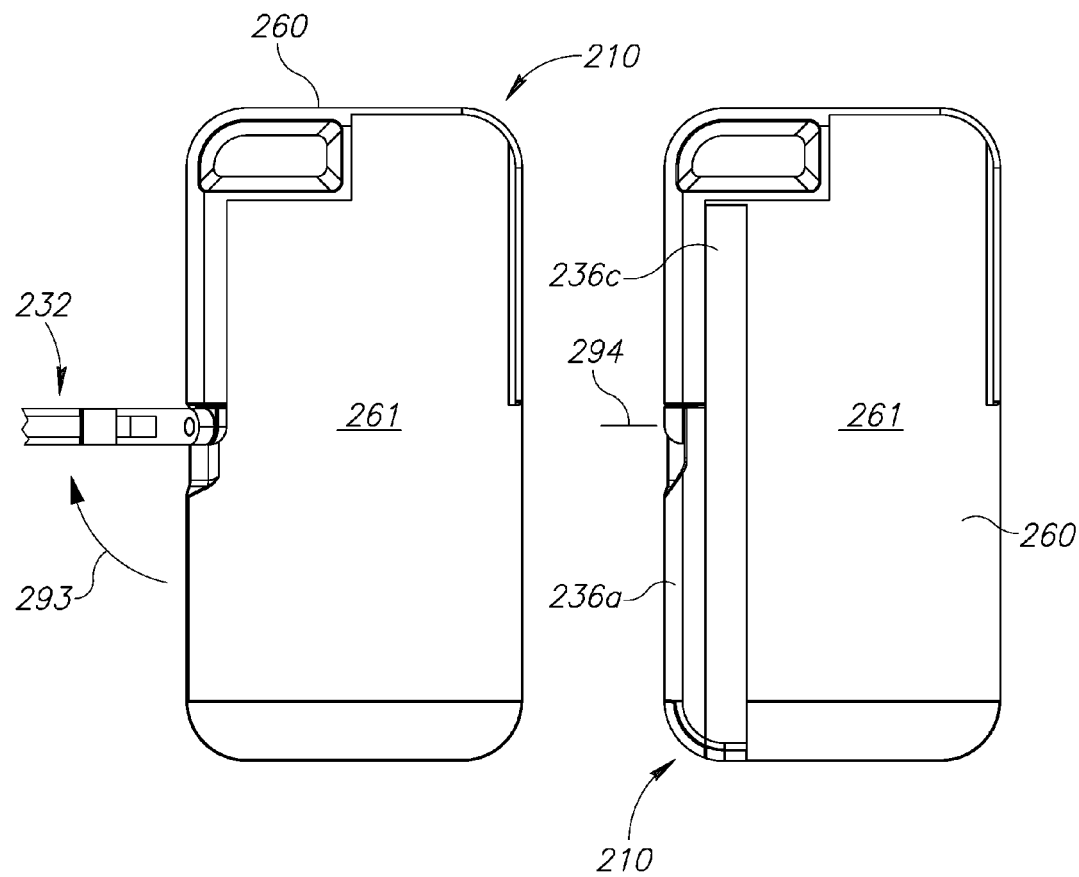
FIG. 14A is a rear view of the system, following extension of most of the collapsible rod, prior to positioning of the chassis.
FIG. 14B is a view similar to FIG. 14A, following complete extension of the rod and deployment of the chassis.

Referring now to FIGS. 13A and 13B, in a second, deployed mode, rod 230 is adapted for extension in a direction transverse from the chassis 260, whereby a first end 232 of the rod 230 is adapted to support the device 12 and a second distal end 234 is adapted to be held in the hand of a user. As depicted in FIG. 17A, in the second mode, extension of the collapsible rod 230 permits positioning of the device 12 and use thereof, remotely from the user.

Collapsible rod 230 includes a plurality of parallel, interconnected rod elements 236 configured for side by side substantially overlapping, coplanar arrangement when in the first compacted mode, as seen, inter alia, in FIG. 12A; and for side by side partially overlapping, coplanar arrangement when in the second deployed mode, as seen, inter alia, in FIG. 17A.

It is seen that each of the plurality of interconnected rod elements 236 is a linear element having a longitudinal axis 237 (FIGS. 12A and 13A), adapted for an axial sliding motion parallel to at least one other adjacent rod element 236. It will be appreciated that the axial sliding motion in a first direction causes extension of the collapsible rod 230 from its compacted position, and that axially sliding the rod elements 236 in a second direction opposite to the first direction, causes retraction of the collapsible rod.

Referring now to FIGS. 13A and 13B, it is seen that among the plurality of rod elements 236 are a first end element 236a terminating in the first end 232 of rod 30, for engaging the device 12; a second end element 236b terminating in the second end 234 of rod 30, for being held in the hand of a user; and a plurality of interconnected intermediate elements 236c, connected to the first and second end elements 236a and 236b.

In the present example, each of the rod elements 236a, 236b and 236c (reference numeral 236 being used to denote each of these types of rod element unless stated otherwise), is formed to include a track 237 which faces laterally outwards in a first direction, towards an adjacent rod element 236. There is further provided a link element 239 which is formed on the opposite side of the rod element 236 relative to the track so as to extend laterally towards an adjacent rod element 236 in a second direction, opposite to the first direction.

As seen, each of the rod elements 236 is in interlocking, side by side, sliding engagement with one or more rod elements 236 by engagement of link element 239 along an adjacent track 237. In the present example, this sliding interlocking arrangement is achieved by providing the link element 239 with a cross-sectional profile so as to be widened at its free end 241, the widened portion 241 being adapted for sliding within a correspondingly widened inner portion 243 of track 237, and effectively confined therewithin. There is also provided, however, a stop member 245 which is fastened to an end 246 of rod element 236 so as to prevent link element 239 from sliding out of an engaged track 237 during extension of rod 30 and consequent disconnection of the individual rod elements 236.

It will be appreciated by persons skilled in the art that the length of collapsible rod 230 when extended is a function of the length and number of rod elements 236, which in turn is a function of the strength of the elements 236 including their material strength. In one example, rod 230 is 71 cm in length, and its various components are made of various materials, including aluminum for tracks 237, plastic (nylon combined with glass fibers) for link elements 239, and plastic (ABS) for stop members 245. This is however merely one example, and other preferred materials may also be used.

Figure 16:
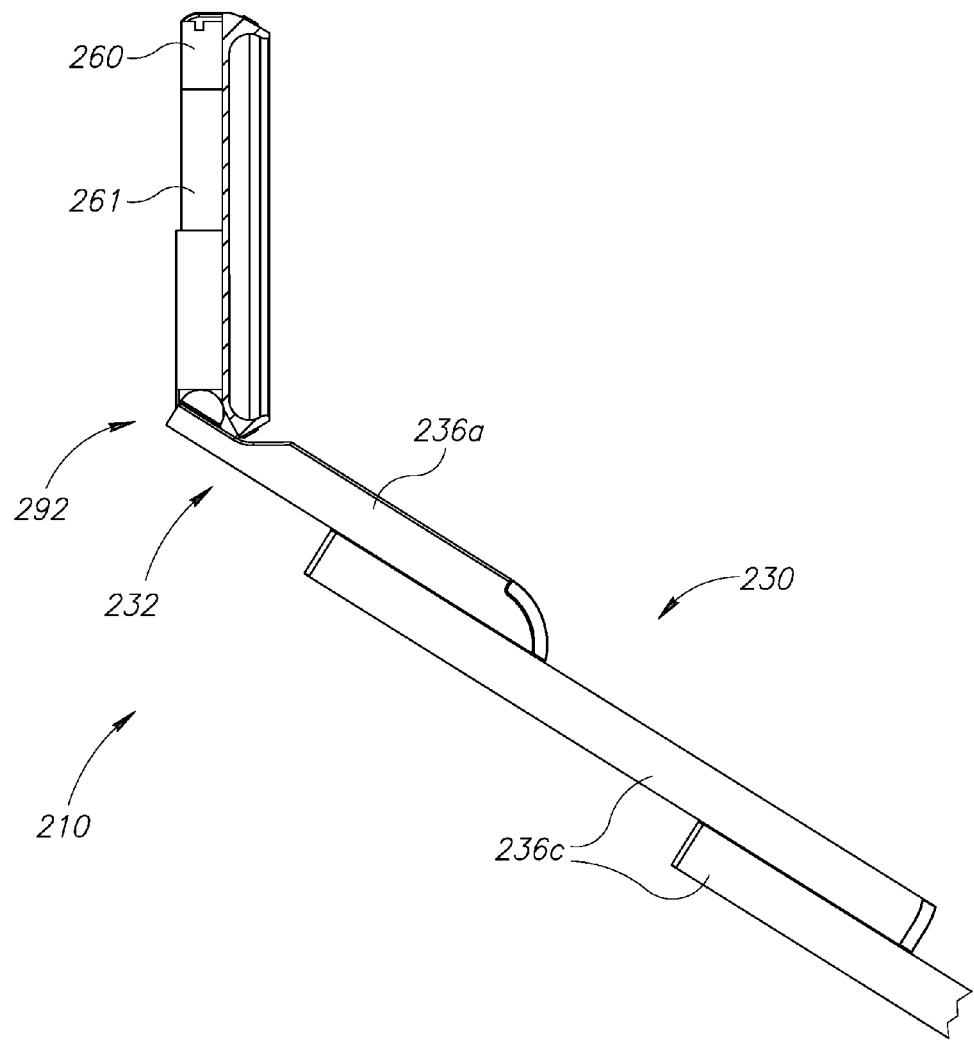
FIG. 16 is a cross-sectional side view of the system when fully deployed.

Referring now briefly to FIGS. 16, 17A and 17B, the first end element 236 of rod 230 is connected to the chassis 260 via a hinge arrangement 292 having multiple degrees of freedom, which is adapted to permit a desired angular positioning of the chassis 260 and thus device 12 with respect to each other, and typically in the illustrated, generally rearward position so as to face the user and thus permit a selfie photograph to be taken. It is however envisaged that other positions may also be desired, when seeking to use rod 230 in order to photograph a target from a different angle and/or closer range than the user would be able to do without use of system 210.

In accordance with one embodiment, hinge arrangement 292 may have a ball and socket type construction. The exploded view of FIG. 13B and the views of FIGS. 14A and 14B however illustrate a simple arrangement, having two degrees of freedom, in which there are seen a pair of mutually perpendicular joints enabling rotation of rod 230 about in a first direction illustrated by first arrow 293 (FIG. 14B) about a first axis 294 (FIG. 14A), and then, as seen in FIG. 17B, in a second direction, illustrated by second arrow 295, about a second axis 296, wherein the first and second axes are mutually perpendicular.

It will be appreciated by persons skilled in the art that the present invention is not limited by what has been shown and described hereinabove, merely by way of non-limiting example. Rather, the scope of the invention is defined solely by the claims, which follow.

We claim:

1. An integral system including:
   a chassis adapted for securing to a handheld digital device; and
   a selectably deployable dual purpose collapsible rod operable in a first, compacted mode for storage across the rear of the handheld digital device so as to cover a major portion of the area thereof and together with said chassis, to absorb mechanical forces directed towards the sides or rear of the handheld digital device, and further operable in a second, deployed mode for extension in a direction transverse from the chassis, whereby a first end of the rod is adapted to support the handheld digital device and a second distal end is adapted to be held in the hand of a user,
   wherein, in said second mode, use of said collapsible rod permits positioning of the handheld digital device from the user and use thereof remotely from the user,
   wherein said collapsible rod includes a plurality of parallel, interconnected rod elements which are configured for side by side substantially overlapping, coplanar arrangement when in said first compacted mode, and for side by side partially overlapping, coplanar arrangement when in said second deployed mode, and
   wherein each of said plurality of interconnected rod elements is a linear element having a longitudinal axis, adapted for an axial sliding motion parallel to at least one other adjacent rod element, said axial sliding motion in a first direction being required so as to achieve extension of said collapsible rod from said compacted position, and further, in a second direction opposite to said first direction, so as to achieve retraction of said collapsible rod from said deployed position to said compacted position.

2. The integral system according to claim 1, wherein said plurality of interconnected rod elements include:
   a first end element terminating in said first end for engaging the handheld digital device;
   a second end element terminating in said second end for being held in the hand of a user; and
   a plurality of interconnected intermediate elements connected to said first and said second end elements.

3. The integral system according to claim 2, wherein each of said plurality of interconnected rod elements is adjacent to and operative for interlocking engagement with and side by side sliding along at least one other of said plurality of interconnected rod elements.

4. The integral system according to claim 3, wherein each of said plurality of interconnected intermediate elements is adjacent to and operative for interlocking engagement with and side by side sliding along two of said plurality of interconnected rod elements.

5. The integral system according to claim 4, wherein each of said plurality of interconnected rod elements includes:
   a track configured to face laterally towards an adjacent rod element in a first direction,
   a link element formed on the opposite side of said rod element relative to said track so as to extend towards an adjacent rod element in a second direction, opposite to said first direction, wherein said link element of one rod element is adapted to engage said track of an adjacent element so as to be slidably movable therealong; and
   a stop element provided at the end of said track so as to prevent disconnection of said link element from said track of said adjacent element.

6. The integral system according to claim 2, wherein said first end element is connected to said chassis via a hinge arrangement having multiple degrees of freedom so as to facilitate a desired angular adjustment of said chassis and said handheld digital device relative to said collapsible rod.

7. The integral system according to claim 6, wherein said hinge arrangement has at least two degrees of freedom.

8. The integral system according to claim 1, also including a remotely located control for operating the handheld digital device.

9. The integral system according to claim 8, wherein said remotely located control is mounted at the second, distal end of said collapsible rod.

* * * * *